No. 744,192. PATENTED NOV. 17, 1903.
F. W. GREY.
WEIGHING SCALE.
APPLICATION FILED JULY 30, 1903.
NO MODEL.
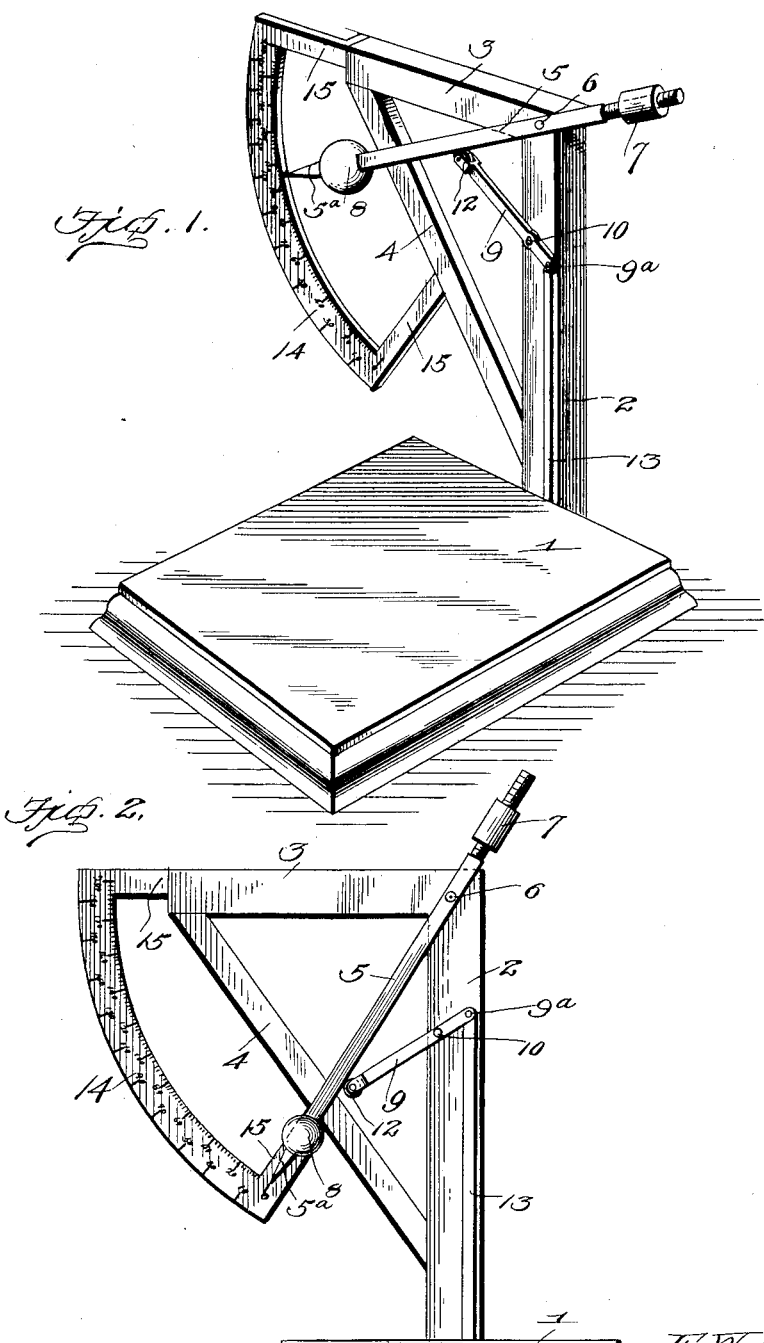
Witnesses
Inventor
F. W. Grey
By
Attorney No. 744,192. Patented November 17, 1903.

UNITED STATES PATENT OFFICE.

FREDERICK WILLIAM GREY, OF LOS ANGELES, CALIFORNIA.

WEIGHING-SCALE.

SPECIFICATION forming part of Letters Patent No. 744,192, dated November 17, 1903.

Application filed July 30, 1903. Serial No. 167,653. (No model.)

*To all whom it may concern:*

Be it known that I, FREDERICK WILLIAM GREY, a citizen of the United States, residing at Los Angeles, in the county of Los Angeles and State of California, have invented certain new and useful Improvements in Weighing-Scales; and I do declare the following to be a full, clear, and exact description of the invention, such as will enable others skilled in the art to which it appertains to make and use the same.

This invention relates to improvements in weighing-scales.

The object of the invention is to provide a scale which will accurately weigh and indicate the amount of weight of articles placed upon the platform of the same.

A further object is to provide a scale of this character which will be simple in construction, consisting of but few parts, the construction and arrangement of the same being such that the use of springs will not be required, means being employed whereby the loss of weight from wear may be compensated for.

With these and other objects in view the invention consists of certain novel features of construction, combination, and arrangement of parts, as will be more fully described, and particularly pointed out in the appended claims.

In the accompanying drawings, Figure 1 is a perspective view of the scale, showing the position of the parts when in use for weighing. Fig. 2 is a front elevation of the same, showing parts in their normal position.

Referring more particularly to the drawings, 1 denotes the platform of the scale, movably mounted on a suitable base. 2 denotes the standard. 3 denotes the arm, suitably braced to the standard by a brace-bar 4. An index-arm 5 is pivotally connected near one end to the upper end of the standard 2, as shown at 6. The short end of the arm 5 is screw-threaded and on said end is screwed an adjustable weight 7, which is adapted to compensate for the loss of weight of the parts due to wear.

8 denotes a counterbalancing-weight arranged on the opposite end of the arm 5 and is for the purpose of counterbalancing the weight of the platform and swinging said frame to restore the platform to its normal position when the weight is removed therefrom.

9 denotes a lever pivotally connected to the standard, as at 10. In the end of the longer part of the lever is pivotally mounted an antifriction wheel or roller 12, which is adapted to bear on the under side of the longer end of the arm 5. To the shorter end of the lever 9 is hinged, as by a knuckle-joint $9^a$, a vertically-disposed bar or rod 13, the lower end of which is connected to the platform.

14 denotes a segmental-shaped scale-beam, which is connected to the arm 3 and brace-bar 4 by arms or bars 15. The face of the scale-beam is graduated in marks indicating pounds and fractions of pounds. Along the graduations is adapted to be moved the pointed end or index-finger $5^a$ of the index-arm 5.

The normal position of the index-arm is at O, as shown in Fig. 1, to which position it is moved by the weight 8; but when an article to be weighed is placed upon the platform the weight of the same will draw upon the bar 13 and rock the lever 9 against the resistance of said weight 8, which will raise the index-arm 5. The friction-roller 12 in the end of the lever being adapted to run along under the arm 5, thereby prevents friction between the lever 9 and the index-arm as the former raises the arm.

By adjusting the weight 7 on the short end of the index-arm any loss due to wear of the parts may be compensated for and the accuracy of the scale always be maintained.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. In a weighing-scale, the combination with a platform, a standard and a supporting-arm, of a segmental dial or indicating-plate fixed thereto, an index-arm pivoted to said standard, a counterbalancing-weight carried by one end of said arm, an adjustable compensating weight carried by the opposite end of said arm, a lever pivoted to said standard, a friction-roller journaled in one end of said lever and adapted to engage said index-arm, and a rod or bar connecting the opposite end of said lever to said platform, substantially as described.

2. In a weighing-scale, the combination of a platform, a triangular supporting-frame, a segmental dial or scale-bar secured to the base and one of the side arms of said frame, an index-arm pivoted eccentrically to the vertex portion of the frame and provided upon its long member with a finger to traverse said dial, means connected with the platform for engaging and moving the long member of the arm, a weight carried by the long member of the arm to counterbalance the weight of the platform and restore the parts to their normal positions, and a weight adjustably connected to the short member of said arm for compensating for the loss of weight of the parts due to wear, substantially as described.

3. In a weighing-scale, the combination with a base carrying a platform, of a standard rising from the base and provided with a horizontal arm, a brace diagonally connecting the outer end of said arm with the standard and forming therewith a triangular frame of which said brace forms the base, a segmental dial secured upon the base side of the frame, an index-arm pivoted eccentrically to the vertex portion of the frame and provided upon its long member with a finger to sweep over said dial, a lever eccentrically pivoted upon the standard of the frame and provided with a long arm having a shifting engagement with the long member of the index-arm, a rod connecting the short arm of said lever with the platform, a weight upon the long member of the index-arm for counterbalancing the weight of the platform and restoring the parts to their normal positions, and a weight adjustable upon the short member of the index-arm to compensate for the loss of weight of the parts due to wear.

In testimony whereof I have hereunto set my hand in presence of two subscribing witnesses.

FREDERICK WILLIAM GREY.

Witnesses:
JOHN SATTERWHITE,
J. B. SANCHEZ.